US010717846B2

(12) United States Patent
Kim et al.

(10) Patent No.: US 10,717,846 B2
(45) Date of Patent: *Jul. 21, 2020

(54) PLASTICIZER COMPOSITION, RESIN COMPOSITION AND METHOD OF PREPARING THE SAME

(71) Applicant: LG CHEM, LTD., Seoul (KR)

(72) Inventors: Hyun Kyu Kim, Daejeon (KR); Mi Yeon Lee, Daejeon (KR); Yun Ki Cho, Daejeon (KR); Jeong Ju Moon, Daejeon (KR); Joo Ho Kim, Daejeon (KR); Seok Ho Jeong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 78 days.

This patent is subject to a terminal disclaimer.

(21) Appl. No.: 15/766,708

(22) PCT Filed: Jun. 13, 2017

(86) PCT No.: PCT/KR2017/006144
§ 371 (c)(1),
(2) Date: Apr. 6, 2018

(87) PCT Pub. No.: WO2017/217738
PCT Pub. Date: Dec. 21, 2017

(65) Prior Publication Data
US 2018/0319953 A1    Nov. 8, 2018

(30) Foreign Application Priority Data

Jun. 15, 2016  (KR) .................. 10-2016-0074501
Jun. 9, 2017   (KR) .................. 10-2017-0072509

(51) Int. Cl.
| | |
|---|---|
| *C08K 5/11* | (2006.01) |
| *C08K 5/09* | (2006.01) |
| *C08L 23/06* | (2006.01) |
| *C08L 23/08* | (2006.01) |
| *C08L 23/12* | (2006.01) |
| *C08L 25/06* | (2006.01) |
| *C08L 27/06* | (2006.01) |
| *C08L 75/04* | (2006.01) |
| *C08K 5/10* | (2006.01) |
| *C08J 3/18* | (2006.01) |
| *C08K 5/101* | (2006.01) |
| *C08K 5/1515* | (2006.01) |

(52) U.S. Cl.
CPC . *C08K 5/11* (2013.01); *C08J 3/18* (2013.01); *C08K 5/09* (2013.01); *C08K 5/10* (2013.01); *C08K 5/101* (2013.01); *C08K 5/1515* (2013.01); *C08L 23/06* (2013.01); *C08L 23/0853* (2013.01); *C08L 23/12* (2013.01); *C08L 25/06* (2013.01); *C08L 27/06* (2013.01); *C08L 75/04* (2013.01)

(58) Field of Classification Search
CPC ... C08K 5/11; C08K 5/09; C08K 5/10; C08K 5/101; C08K 5/1515; C08J 3/18; C08L 23/06; C08L 23/0853; C08L 23/12; C08L 25/06; C08L 27/06; C08L 75/04
USPC ........................................................ 524/308
See application file for complete search history.

(56) References Cited

U.S. PATENT DOCUMENTS

| | | | |
|---|---|---|---|
| 9,321,901 | B2 | 4/2016 | Frenkel et al. |
| 2007/0135562 | A1 | 6/2007 | Freese et al. |
| 2011/0046283 | A1* | 2/2011 | Grass .................... C07C 69/704 524/285 |
| 2012/0181061 | A1 | 7/2012 | Chaudhary et al. |
| 2013/0066000 | A1 | 3/2013 | Freese et al. |
| 2014/0309345 | A1 | 10/2014 | Frenkel et al. |
| 2014/0323622 | A1 | 10/2014 | Chaudhary et al. |
| 2015/0368431 | A1 | 12/2015 | Ghosh-Dastidar et al. |
| 2018/0142078 | A1 | 5/2018 | Kim et al. |

FOREIGN PATENT DOCUMENTS

| | | |
|---|---|---|
| CN | 101326230 A | 12/2008 |
| CN | 103756166 A | 4/2014 |
| CN | 103975011 A | 8/2014 |
| CN | 105008447 A | 10/2015 |
| CN | 105348672 A | 2/2016 |
| CN | 107614586 A | 1/2018 |
| EP | 3275930 A1 | 1/2018 |
| JP | 2003072289 A | 3/2003 |
| JP | 5841946 B2 | 1/2016 |
| KR | 20110026507 A | 3/2011 |

(Continued)

OTHER PUBLICATIONS

Greenspan et al., "Epoxy Fatty Acid Ester Plasticizers," Ind. Engr. Chem., vol. 45, No. 12, pp. 2722-2726. (Year: 1953).*

(Continued)

*Primary Examiner* — Josephine L Chang
(74) *Attorney, Agent, or Firm* — Dentons US LLP

(57) ABSTRACT

The present invention relates to a plasticizer composition which includes an epoxidized alkyl ester composition including one or more compounds represented by the following Chemical Formula 1; and a citrate-based material, wherein a weight ratio of the epoxidized alkyl ester composition and the citrate-based material is in a range of 90:10 to 10:90:

[Chemical Formula 1]

$$R_2\text{—}O\text{—}\underset{\underset{O}{\|}}{C}\text{—}R_1$$

10 Claims, No Drawings

(56) References Cited

FOREIGN PATENT DOCUMENTS

| KR | 20140116371 A | 10/2014 |
| KR | 101570386 B1 | 11/2015 |
| KR | 20150131016 A | 11/2015 |

OTHER PUBLICATIONS

CN 103756166 A, machine translation, Google Patents. (Year: 2014).*
CN 105348672 A, machine translation, Google Patents. (Year: 2016).*
Database WPI: "Heat-resistant environment-friendly PVC material includes PVC, nitrile butadiene rubber, methyl methacrylate-butadiene-styrene copolymer, chlorinated polyethylene, stearic acid, zinc phosphite stearate, calcium stearate, and pentaerythritol", XP002786010, Thomson Scientific, Feb. 24, 2016 (Corresponds to CN105348672A).
Database WPI: "Chlorinated polyethylene insulated cable material contains preset amount of chlorinated polyethylene, ethylene propylene diene monomer, epoxy octyl stearate, dioctyl phthalate, calcium stearate, trichloroethyl phosphate and additive", XP002786011, Thomson Scientific, Apr. 30, 2014 (Corresponds to CN103756166A).

* cited by examiner

PLASTICIZER COMPOSITION, RESIN COMPOSITION AND METHOD OF PREPARING THE SAME

CROSS-REFERENCE TO RELATED APPLICATION

This application is a National Stage Application of International Application No. PCT/KR2017/006144, filed Jun. 13, 2017, and claims the benefit of Korean Patent Application No. 10-2016-0074501, filed Jun. 15, 2016, and Korean Patent Application No. 10-2017-0072509, filed on Jun. 9, 2017, contents of which are incorporated herein by reference in their entirety for all purposes as if fully set forth below.

TECHNICAL FIELD

The present invention relates to a plasticizer composition, a resin composition and a method of preparing the same.

BACKGROUND ART

In general, a plasticizer forms an ester through a reaction between an alcohol and a polycarboxylic acid such as phthalic acid or adipic acid. Also, there is continuing research on compositions of plasticizers that can replace phthalate-based plasticizers such as terephthalate-based, trimellitate-based, and other polymer-based plasticizers in consideration of domestic and international regulations on phthalate-based plasticizers harmful to human bodies.

In general, a plasticizer has been used as a material for various products including products in various fields such as electric wires, pipes, flooring materials, wallpaper, sheets, artificial leather, tarpaulin, tapes, and food packaging materials, which are prepared by processing methods such as extrusion molding, injection molding, calendaring, and the like, after a resin such as polyvinyl chloride (PVC) and various additives such as a filler, a stabilizer, a pigment, an anti-fogging agent, and the like are properly added to impart various processing properties.

With the current situation in the plasticizer market, the development of environmentally friendly plasticizers has been competitively conducted in this field due to environmental issues concerning the phthalate plasticizers. In recent years, novel products have been developed to improve inferior qualities, such as plasticizing efficiency, migration, etc., of di(2-ethylhexyl)terephthalate (DEHTP), which has been used as a common product among the environmentally friendly plasticizers.

Accordingly, there is an ongoing need for research on technology in which novel composition products such as products having properties superior to those of di(2-ethylhexyl)terephthalate are developed so that the composition products are optimally applicable as plasticizers for vinyl chloride-based resins.

DISCLOSURE

Technical Problem

Accordingly, the present inventors have continuously conducted research on plasticizers, and found a plasticizer composition capable of improving physical properties of a vinyl chloride-based resin composition. Therefore, the present invention has been completed based on the facts.

That is, it is an aspect of the present invention to provide a plasticizer composition capable of improving physical properties such as hardness, tensile and elongation retention, migration resistance and volatile loss when used as a plasticizer of a resin composition, a method of preparing the same, and a resin composition including the plasticizer composition.

Technical Solution

To solve the above problems, according to one aspect of the present invention, there is provided a plasticizer composition which includes an epoxidized alkyl ester composition including one or more compounds represented by the following Chemical Formula 1; and a citrate-based material, wherein a weight ratio of the epoxidized alkyl ester composition and the citrate-based material is in a range of 90:10 to 10:90, and one or more citrate-based materials are included.

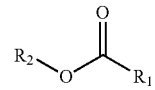

[Chemical Formula 1]

In Chemical Formula 1, $R_1$ is an alkyl group containing one or more epoxy groups and having 8 to 20 carbon atoms, and $R_2$ is an alkyl group having 4 to 10 carbon atoms.

The epoxidized alkyl ester composition may have an iodine value of less than 3.5 $I_2$/100 g.

The epoxidized alkyl ester composition may have an oxirane content (O.C.) of 3.5% or more.

The epoxidized alkyl ester composition may have an oxirane index (O.I.) of 1.0 or more.

The epoxidized alkyl ester composition may include an epoxy alkyl ester composition including one or more compounds represented by Chemical Formula 1, and may further include an alkyl ester composition including one or more compounds represented by the following Chemical Formula 2.

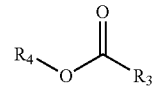

[Chemical Formula 2]

In Chemical Formula 2, $R_3$ is an alkyl group having 8 to 20 carbon atoms, and $R_4$ is an alkyl group having 4 to 10 carbon atoms.

$R_2$ in Chemical Formula 1 may be an alkyl group having 4 to 9 carbon atoms.

The epoxidized alkyl ester composition may include two or more compounds having a different number of carbon atoms in $R_2$ of Chemical Chemical Formula 1.

$R_2$ in Chemical Formula 1 may be selected from the group consisting of a butyl group, an isobutyl group, a pentyl group, a hexyl group, a heptyl group, an isoheptyl group, an octyl group, a 2-ethylhexyl group, a nonyl group, an isononyl group, a 6-methyloctyl group, a decyl group, an isodecyl group, and a 2-propylheptyl group.

The citrate-based material may include any one selected from the group consisting of a hybrid alkyl-substituted citrate-based material having 4 to 10 carbon atoms, and a non-hybrid alkyl-substituted citrate-based material having 4 to 10 carbon atoms.

The citrate-based material may be a material which does not have an acetyl group bound thereto.

To solve the above problems, according to another aspect of the present invention, there is provided a resin composition including 100 parts by weight of a resin; and 5 to 150 parts by weight of the plasticizer composition defined in claim 1.

The resin may include one or more selected from the group consisting of ethylene vinyl acetate, polyethylene, polypropylene, polyketone, polyvinyl chloride, polystyrene, polyurethane, and a thermoplastic elastomer.

Advantageous Effects

The plasticizer composition according to one exemplary embodiment of the present invention can provide excellent physical properties such as migration resistance and resistance to volatility as well as excellent plasticizing efficiency, tensile strength and an excellent elongation rate when used in a resin composition.

Mode for Invention

Hereinafter, the present invention will be described in detail.

First, the present invention has a technical feature in providing a plasticizer composition capable of improving inferior physical properties caused by structural limitations.

According to one exemplary embodiment of the present invention, there is provided a plasticizer composition which includes an epoxidized alkyl ester composition including one or more compounds represented by the following Chemical Formula 1; and a citrate-based material, wherein a weight ratio of the epoxidized alkyl ester composition and the citrate-based material is in a range of 9:1 to 1:9, and one or more citrate-based materials are included.

[Chemical Formula 1]

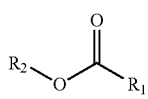

In Chemical Formula 1, $R_1$ is an alkyl group containing one or more epoxy groups and having 8 to 20 carbon atoms, and $R_2$ is an alkyl group having 4 to 10 carbon atoms.

The epoxidized alkyl ester composition may include one or more epoxidized fatty acid alkyl esters (eFAAEs), and specifically may include one or more compounds represented by Chemical Formula 1. In this case, the 'alkyl' of the epoxidized alkyl ester compound may have 4 to 10 carbon atoms.

That is, $R_2$ in Chemical Formula 1 may have 4 to 10 carbon atoms, preferably 4 to 9 carbon atoms. Also, $R_2$ in Chemical Formula 1 may be a butyl group (hereinafter abbreviated as 'B'), an isobutyl group (hereinafter abbreviated as 'iB'), a pentyl group (hereinafter abbreviated as 'P'), a hexyl group (hereinafter abbreviated as a heptyl group (hereinafter abbreviated as 'Hp'), an isoheptyl group (hereinafter abbreviated as 'iHp'), an octyl group (hereinafter abbreviated as 'nO'), a 2-ethylhexyl group (hereinafter abbreviated as 'EH' or 'O'), a nonyl group (hereinafter abbreviated as 'nN'), an isononyl group (hereinafter abbreviated as 'IN'), a 6-methyloctyl group (hereinafter abbreviated as 'MO'), a decyl group (hereinafter abbreviated as 'D'), an isodecyl group (hereinafter abbreviated as 'ID'), or a 2-propylheptyl group (hereinafter abbreviated as 'PH').

When $R_2$ in Chemical Formula 1 has 4 to 10 carbon atoms, transparency (i.e., haze) and volatile loss may be excellent. The transparency is a physical property important for plasticizers which are applied to resins for food packaging materials. When the transparency is poor, a plasticizer has no commerciality and thus cannot be applied. On the other hand, when the volatile loss property is poor, processability and workability may be deteriorated because the plasticizer may be easily volatilized when heat is applied during processing, which makes it difficult to apply the plasticizer to resins for food packaging materials. Therefore, it may be desirable to adjust the number of carbon atoms of $R_2$ to be in a range of 4 to 10 in the epoxidized alkyl ester compound represented by Chemical Formula 1.

The epoxidized alkyl ester composition may have less than 4 carbon atoms, for example, one carbon atom. When a material having a smaller number of carbon atoms such as epoxidized methyl ester is applied, migration loss and volatile loss may be very poor, and, transparency, adhesiveness and an elongation rate may be deteriorated. On the other hand, when an epoxidized alkyl ester having greater than 10 carbon atoms is applied, a migration property may be degraded due to a decrease in plasticizing efficiency or compatibility with resins because the epoxidized alkyl ester has a very high molecular weight. Therefore, the epoxidized alkyl ester included in the epoxidized alkyl ester composition may be preferably limited to epoxidized alkyl esters having 4 to 10 carbon atoms. Preferably, epoxidized alkyl esters having 4, 8 or 9 carbon atoms may be applied.

Also, the epoxidized alkyl ester composition represented by Chemical Formula 1 includes two or more compounds, and may be a composition formed by mixing two or more compounds having a different number of carbon atoms in $R_2$. When the two or more compounds are included, a mixture of a compound in which $R_2$ has 4 carbon atoms and a compound in which $R_2$ has 8 carbon atoms, or a mixture of a compound in which $R_2$ has 5 carbon atoms and a compound in which $R_2$ has 9 carbon atoms may be preferred.

The epoxidized alkyl ester composition may have an oxirane content (O.C.) of 3.5% or more, 4.0% or more, or 4.2% or more, and preferably 4.5% or more. Also, the epoxidized alkyl ester composition may have an iodine value of less than 3.5 $I_2/100$ g (the unit "$I_2/100$ g" is omitted hereinafter), preferably 3.2 or less, and more preferably 3.0 or less.

When the epoxidized alkyl ester composition is applied to the plasticizer composition, the measured iodine value and oxirane content may serve as important factors. In particular, the iodine value and the oxirane content may have an influence on plasticizer characteristics in the case of the plasticizer composition included in food wrapping materials essentially requiring environmentally friendly characteristics.

When the iodine value is shown to be greater than or equal to 3.5, the plasticizer composition is not up to standards in functionality evaluation. For example, the plasticizer composition may not be suitable for use in food wrapping materials due to a dark color of the plasticizer composition. Also, when the iodine value is less than 3.5, mechanical properties such as tensile strength and elongation rate may be both improved.

Therefore, the epoxidized alkyl ester composition may preferably have an iodine value of less than 3.5, more preferably 3.2 or less, and further preferably 3.0 or less. The iodine value refers to a content of double bonds present in one molecule, and thus may be obtained from a value measured by a titration method through the iodination of the double bonds.

Also, the oxirane content may vary depending on the number of epoxy groups contained in a substituent represented by $R_1$ in Chemical Formula 1. In this case, the oxirane content may be greater than or equal to 3.5%, 4.0%, or 4.2%, and preferably greater than or equal to 4.5%. The oxirane content may be measured by a titration method, and may also be measured by a titration method using a sample and an acidic solution.

The iodine value may refer to a content of double bonds, and the content of the double bonds may refer to a content of double bonds remaining after performing an epoxidation reaction such as epoxidation of a vegetable oil or fatty acid alkyl ester. That is, because the oxirane content and the iodine value may be indexes indicative of the extent to which the epoxidation is carried out, the oxirane content and the iodine value may be somewhat associated with each other, and may be theoretically in inverse proportion to each other.

However, in effect, because the double bonds of the vegetable oil or fatty acid alkyl ester may vary depending on the materials, the two parameters do not exactly form an inverse relationship or a trade-off relationship. Among the two materials, a material having a higher iodine value may also have a higher oxirane content as well. Therefore, materials in which the iodine value and oxirane content of the epoxidized alkyl ester compound satisfy the aforementioned ranges may be preferably applied to the plasticizer composition used for environmentally friendly food wrapping materials.

Meanwhile, the oxirane index (O.I.) of the epoxidized alkyl ester compound may be greater than or equal to 1.0.

As such, the relationship between the iodine value and the oxirane content is as described above. At the same time, materials satisfying the oxirane index of 1.0 or more, optimally, 2.0 or more may be preferred. The 'oxirane index' may be a ratio of the oxirane content to the iodine value of the epoxidized alkyl ester compound, that is, a ratio of the double bonds epoxidized through an epoxidation reaction and the remaining double bonds that are not reacted.

Specifically, the oxirane index may refer to a ratio of the oxirane content to the iodine value, and may be, for example, greater than or equal to 1.0. That is, when a value obtained by dividing the oxirane content of the epoxidized alkyl ester by the iodine value is greater than or equal to 1.0, a further optimized plasticizer composition may be obtained.

The epoxidized alkyl ester composition includes an epoxy alkyl ester composition including one or more compounds represented by Chemical Formula 1, and may also further include an alkyl ester composition including one or more compounds represented by the following Chemical Formula 2.

[Chemical Formula 2]

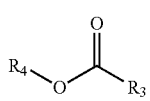

In Chemical Formula 2, $R_3$ is an alkyl group having 8 to 20 carbon atoms, and $R_4$ is an alkyl group having 4 to 10 carbon atoms.

In the alkyl ester composition including one or more compounds represented by Chemical Formula 2, an epoxy group may not be included in $R_3$, and fatty acid moieties of the epoxidized oil may vary widely in a process of preparing an epoxy-based alkyl ester composition using an epoxidized oil and an alcohol. Among these, there may be fatty acid moieties to which an epoxy group is not bound, and there may be compounds derived from such fatty acid moieties.

When such a saturated alkyl ester is included in the plasticizer composition, a separate purification process is not necessary, and thus a cost of a product may be saved. Also, when an alkyl ester composition having a small number of carbon atoms, that is, 8 to 18 carbon atoms, and containing no oxirane is included, plasticizing efficiency and migration may be improved. However, when the content of such a saturated alkyl ester composition accounts for approximately 80% by weight of the entire plasticizer composition including an unsaturated epoxidized alkyl ester composition, compatibility with a vinyl chloride resin may be deteriorated. Therefore, when the saturated alkyl ester composition has a compositional ratio of 70% by weight or less, preferably 50% by weight or leas, and more preferably 30% by weight or less, excellent compatibility with the vinyl chloride resin may be made exhibited.

According to one exemplary embodiment of the present invention, the plasticizer composition also include a citrate-based material, and the citrate-based material may include one or more compounds selected from the group consisting of a hybrid alkyl-substituted citrate-based material having 4 to 10 carbon atoms, and a non-hybrid alkyl-substituted citrate-based material having 4 to 10 carbon atoms.

The citrate-based material may be a compound represented by the following Chemical Formula 3.

[Chemical Formula 3]

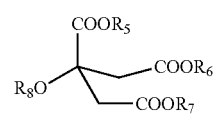

In Chemical Formula 3, $R_5$ to $R_7$ are each independently an alkyl group having 4 to 10 carbon atoms, and $R_8$ is hydrogen.

In the citrate-based material, $R_5$ to $R_7$ in Chemical Formula 3 may be each independently a butyl group, an isobutyl group, a hexyl group, a heptyl group, an isoheptyl group, a 2-ethylhexyl group, an isononyl group, a 2-propylheptyl group, or an isodecyl group, provided that $R_5$ to $R_7$ may be the same or different from each other.

However, a compound having 4 carbon atoms may be preferably applied. In this case, a compound in which the number of carbon atoms does not exceed 10 may be preferred. Therefore, it may be desirable that a compound containing a butyl group, a 2-ethylhexyl group, an isononyl group, a 2-propylheptyl group, or an isodecyl group is applied.

Citrates in which $R_5$ to $R_7$ are alkyl groups having 4 to 10 carbon atoms and the alkyl groups are different from each other may, for example, include a citrate having combined substituents of a butyl group and a 2-ethylhexyl group, a citrate having combined substituents of a butyl group and a heptyl group, a citrate having combined substituents of an isononyl group and a 2-propylheptyl group, a citrate having combined substituents of a 2-ethylhexyl group and a 2-propylheptyl group, a citrate having combined substituents of an isodecyl group and a 2-ethylhexyl group, etc. In addition, a citrate having combined substituents of alkyl groups in which the number of carbon atoms is selected between 4 and 10 and which have a different number of carbon atoms, and the like may be applied, and the alkyl group may be linear or branched.

Citrates in which $R_5$ to $R_7$ are alkyl groups having 4 to 10 carbon atoms and the alkyl groups are the same as each other may, for example, include tributyl citrate (TBC), triheptyl citrate (THpC), tri(2-ethylhexyl) citrate (TEHC), triisononyl citrate (TiNC), tri(2-propylheptyl)citrate (TPHC), etc. In addition, the alkyl groups having 4 to 10 carbon atoms may be applied.

A compound in which the upper limit of the number of carbon atoms of the alkyl group is preferably 10 may be applied. When the number of carbon atoms exceeds 10, characteristics such as absorption rate and plasticizing efficiency may be deteriorated due to an excessive increase in molecular weight.

Meanwhile, the hybrid or non-hybrid alkyl-substituted citrate compound such as trialkyl citrate, di-n-alkyl-m-alkyl citrate, and the like may be applied. In this case, when an acetyl group is present in a citrate-based material, that is, when $R_8$ is an acetyl group, processability and a gelling property may be somewhat deteriorated due to deteriorated physical properties, especially plasticizing efficiency, of the plasticizer. Also, there is a burden of adding economic and facility costs required for disposal of an acetic acid waste generated as by-products during preparation.

That is, when $R_8$ in Chemical Formula 3 is an acetyl group in the citrate-based material, problems such as deteriorated plasticizing efficiency, an increase in the amount of the added plasticizer to overcome the problem of deteriorated plasticizing efficiency, and an increase in product costs through the increase in the amount of the added plasticizer, and the like may be caused, compared to when $R_8$ in Chemical Formula 3 is hydrogen. When a citrate-based material in which $R_8$ is an acetyl group is applied, consideration of various aspects such as marketability, economic feasibility, and physical properties is required.

As described above, when a mixture of the epoxidized alkyl ester composition and the citrate-based material is used as the plasticizer composition, the mixture may be applied to various applications, depending on a compositional ratio of the mixture, and there are advantages in that the mixture may be very widely used for resins for food packaging materials and resins applied to car seats.

Here, the epoxidized alkyl ester composition and the citrate-based material in the plasticizer composition may be included at a weight ratio of 90:10 to 10:90. The upper limit of the weight ratio may be in an applicable range of 90:10, 85:15, 80:20, 70:30, or 60:40, and the lower limit of the weight ratio may be in an applicable range of 10:90, 15:85, 20:80, 30:70, or 40:60.

When the epoxidized alkyl ester composition and the citrate-based material are included within such ranges, lower migration characteristics of the epoxidized alkyl ester composition may make up for lower heat resistance of the citrate-based material, and improvement of mechanical properties may also be promoted as well.

The plasticizer composition includes an epoxidized alkyl ester composition and a citrate-based material, and may also further include an epoxidized oil.

The plasticizer composition in which the epoxidized alkyl ester composition and the citrate-based material are mixed may further include the epoxidized oil to further supplement the physical properties.

The epoxidized oil may, for example, include epoxidized soybean oil, epoxidized castor oil, epoxidized linseed oil, epoxidized palm oil, epoxidized stearate, epoxidized oleate, epoxidized tall oil, epoxidized linoleate, or a mixture thereof. Preferably, epoxidized soybean oil (ESO) or epoxidized linseed oil (ELO) may be applied, but the present invention is not limited thereto.

Also, the epoxidized oil may be included at a content of 1 to 100 parts by weight, preferably a content of 1 to 80 parts by weight, based on a total of 100 parts by weight of the epoxidized alkyl ester composition and the citrate-based material. When the epoxidized oil is included within this range, a plasticizer composition having properly excellent physical properties between mechanical and physical properties and migration characteristics may be obtained.

In the present invention, a method of preparing the plasticizer composition may be carried out using a blending method. Here, one example of the blending method is as follows.

The plasticizer composition may be prepared by preparing an epoxidized alkyl ester composition including one or more compounds represented by the following Chemical Formula 1; and a citrate-based material, and blending the epoxidized alkyl ester composition and the citrate-based material at a weight ratio of 90:10 to 10:90. Here, the plasticizer composition is characterized by including one or more citrate-based materials.

[Chemical Formula 1]

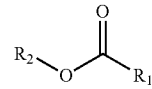

In Chemical Formula 1, $R_1$ is an alkyl group containing one or more epoxy groups and having 8 to 20 carbon atoms, and $R_2$ is an alkyl group having 4 to 10 carbon atoms.

In the present invention, a method of preparing the plasticizer composition may be a method using an esterification reaction.

First, the epoxidized alkyl ester compound may be an epoxidized alkyl ester compound prepared by allowing an epoxidized oil to react with an alkyl alcohol having 4 to 10 carbon atoms. Here, an epoxidized alkyl ester composition may be applied to a method of preparing the plasticizer composition which includes the epoxidized alkyl ester composition having an iodine value of less than 3.5.

The basic characteristics, such as an iodine value and an oxirane content, of the epoxidized alkyl ester composition are as described above, and thus a description thereof is omitted.

The reaction of the epoxidized oil with the alkyl alcohol having 4 to 10 carbon atoms may be a trans-esterification reaction.

The "trans-esterification reaction" refers to a reaction in which an alcohol reacts with an ester, as shown in the following Scheme 1, so that R" of the ester can be interchanged with R' of the alcohol, as shown in the following Scheme 1.

Scheme 1

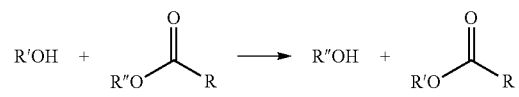

When the trans-esterification reaction is carried out, three types of ester composition may be formed according to three cases, that is, when an alkoxide of the alcohol attacks carbons of two ester groups (RCOOR") present in an ester-based compound; when the alkoxide of the alcohol attacks carbons of one ester group (RCOOR") present in the ester-based compound; and when a reaction is not carried out.

Also, the trans-esterification reaction has an advantage in that a wastewater problem is not caused, compared to an acid-alcohol esterification reaction, and may be carried out without any catalyst. Therefore, problems caused by use of an acidic catalyst may be solved.

According to the present invention, the ester in the trans-esterification reaction may be an epoxidized oil, and the alcohol may be a primary alcohol containing an alkyl group having 1 to 10 carbon atoms. The number of the carbon atoms of the alcohol may be in a range of 1 to 10, and preferably in a range of 4 to 8. After the reaction is completed, the alkyl group of the alcohol may be an alkyl group corresponding to $R^2$ in Chemical Formula 1.

Also, the epoxidized oil may, for example, be epoxidized soybean oil, epoxidized castor oil, epoxidized linseed oil, epoxidized palm oil, epoxidized stearate, epoxidized oleate, epoxidized tall oil, epoxidized linoleate, or a mixture thereof. In this case, the epoxidized oil may be a compound into which a predetermined amount of epoxy groups are introduced through an epoxidation reaction of the vegetable oil.

The epoxidized oil may, for example, be represented by the following Chemical Formula 4, may include three ester groups in one molecule, and contain a predetermined amount of epoxy groups.

[Chemical Formula 4]

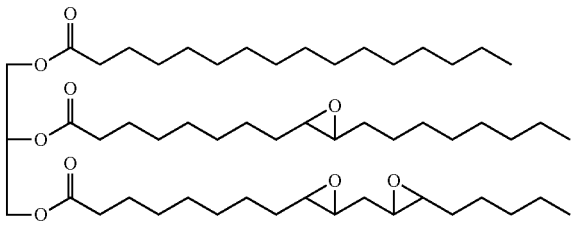

The epoxidized oil represented by Chemical Formula 4 corresponds to one example.

Also, the epoxidized oil may have an iodine value of less than 3.5 ($I_2/100$ g). In this case, the iodine value has a small variation during a trans-esterification reaction, and is not significantly different from the iodine value of the epoxidized alkyl ester compound as the resulting product. Here, the iodine value of the epoxidized oil may be substantially identical to or somewhat smaller than the iodine value of the aforementioned epoxidized alkyl ester composition.

Although the present invention is not limited thereto, when the epoxidized oil is selected and applied, improvement of color and solid material content of the product may be controlled to a more desirable level. Preferably, the epoxidized oil may have an oxirane content of 6.0% or more (approximately 16.2% or more in terms of epoxy content) and an iodine value of 3.0 or less. When the epoxidized oil having such values is selected to prepare an epoxidized alkyl ester composition, the epoxidized oil may have an effect of significantly improving the color and solid material content of the product.

When the epoxidized oil and the alkyl alcohol having 4 to 10 carbon atoms are subjected to a trans-esterification reaction, all of the three ester groups may be isolated, thereby forming three or more epoxy-based ester compounds to which an alkyl group of the alcohol is newly bound.

The trans-esterification reaction may be carried out at a reaction temperature of 40 to 230° C., preferably 50 to 200° C., and more preferably 100 to 180° C. According to preferred embodiments, the trans-esterification reaction is preferably carried out at a reaction temperature of 100 to 180° C. to control a production rate of solids in a final product.

Also, the trans-esterification reaction may be preferably carried out for 30 minutes to 8 hours, more preferably 1 to 6 hours. Also, when the quality of the final product is considered, it is desirable to carry out the trans-esterification reaction for at least 3 hours, and is more desirable to secure a reaction time of at least 4 hours. Although, it is desirable to carry out the reaction for up to 6 hours, when the reaction is carried out for at least 4 hours, viscosity or solid content of the product may be improved to a desired level. However, when the reaction time exceeds 8 hours, the oxirane content may be affected, and thus a decrease in oxirane content may be caused, thereby adversely affecting the quality (for example, color, etc.) of the product.

A desired epoxidized alkyl ester composition may be effectively obtained within the temperature and time ranges. In this case, the reaction time may be calculated from a point of time to reach the reaction temperature after temperature rising for the reactants.

The trans-esterification reaction may be carried out in the presence of a basic catalyst, an acidic catalyst, or a metal catalyst, which provides an effect of reducing the reaction time.

The acidic catalyst may, for example, be sulfuric acid, methanesulfonic acid, or p-toluenesulfonic acid, and the metal catalyst may, for example, be an alkoxide-based organic metal catalyst containing sodium or potassium, a metal oxide catalyst, a metal salt catalyst, or a metal itself.

The metal component may, for example, be one selected from the group consisting of sodium, potassium, tin, titanium, and zirconium, or a mixture of two or more types thereof.

Also, the method may further include separating a polyhydric alcohol and reaction by-products, which are generated after the trans-esterification reaction, and an unreacted alcohol, and washing and distilling the reaction by-products to remove the unreacted alcohol.

Specifically, the purification process may be carried out by cooling and keeping the reaction by-products at a temperature of 80 to 100° C. for a given time after the trans-esterification reaction. In this case, layer separation occurs. Here, an epoxidized alkyl ester and an alcohol may be included in an upper layer, and glycerine and other by-products may be included in a lower layer. Next, to neutralize the catalyst, an aqueous solution for neutralizing a catalyst may be introduced to induce neutralization and washing.

The neutralization and washing processes may be carried out after the lower layer mainly including the by-products is first separated. During the neutralization and washing processes, the by-products of the lower layer may be dissolved in water and then discharged. Then, after the by-products are subjected to a repetitive washing process, the unreacted alcohol and water may be collected and removed.

However, there may be a need to change the neutralization and washing processes, depending on the number of carbon atoms of the alcohol used in the trans-esterification reaction.

For example, when butanol having 4 carbon atoms is used, problems concerning the production of wastewater may occur when the neutralization and washing processes are immediately carried out. Therefore, it may be desirable to remove butanol through distillation. However, in this case, the butanol has a twofold problem in which the by-products (i.e., glycerol) and the product (i.e., epoxidized alkyl ester) may reversely react to generate an epoxidized oil-like material such as a diglyceride or a triglyceride because the catalyst remains active, it is necessary to pay attention to the process design.

By way of another example, when 2-ethylhexyl alcohol having 8 carbon atoms is used, the 2-ethylhexyl alcohol is poorly dissolved in water, and thus causes no problems concerning the production of wastewater. Therefore, in this case, when the alcohol is removed after the neutralization and washing, the neutralization and washing processes may have an advantage in that the processes may be carried out without any critical problems because the product is neutralized and washed after the by-products of the lower layer are removed.

The citrate-based material may be mixed and blended with the epoxidized alkyl ester compound thus prepared based on the aforementioned mixing weight ratio. In this case, the mixing ratio and the citrate-based material to be applied are as described above, and thus a description thereof is omitted.

Meanwhile, like the epoxidized alkyl ester composition, the citrate-based material may also be prepared through an esterification reaction. In this case, a direct esterification reaction in which an alcohol reacts with citric acid, or a trans-esterification reaction in which an alcohol reacts with a citrate may be applied. When the trans-esterification reaction is applied, a mixture of three or more compounds may be formed as a product.

After blending of the citrate-based material, the method may further include additionally adding the epoxidized oil, when necessary. In this case, the epoxidized oil may be selected within the same range as described above, and an amount of the added epoxidized oil may be in a range of 1 to 100 parts by weight, preferably in a range of 1 to 80 parts by weight, based on a total of 100 parts by weight of the epoxidized alkyl ester compound and the citrate-based material. The characteristics of the epoxidized oil are as described above, and thus a description thereof is omitted.

The plasticizer composition thus prepared may be included at 5 to 150 parts by weight, 40 to 100 parts by weight, or 40 to 50 parts by weight based on 100 parts by weight of a resin such as ethylene vinyl acetate, polyethylene, polyketone, polypropylene, polyvinyl chloride, polystyrene, polyurethane, a thermoplastic elastomer, or a mixture thereof, and thus a resin composition may be provided.

When the resin composition include the aforementioned plasticizer composition, the resin composition may be applied to various applications such as flooring materials, wallpaper, films, hoses, or electric wires, and thus may exhibit basic mechanical properties, such as tensile strength, elongation rate, plasticizing efficiency and volatile loss, which are equivalent or superior to the physical properties of the conventional plasticizers.

According to one exemplary embodiment of the present invention, the resin composition may further include a filler.

The filler may be included at a content of 0 to 300 parts by weight, preferably 50 to 200 parts by weight, and more preferably 100 to 200 parts by weight, based on 100 parts by weight of the resin.

According to one exemplary embodiment of the present invention, fillers known in the related art may be used as the filler, but the present invention is not particularly limited thereto. For example, the filler may be a mixture of one or more types selected from silica, magnesium carbonate, calcium carbonate, hard charcoal, talc, magnesium hydroxide, titanium dioxide, magnesium oxide, calcium hydroxide, aluminum hydroxide, aluminum silicate, magnesium silicate, and barium sulfate.

According to one exemplary embodiment of the present invention, the resin composition may also further include other additives such as a stabilizer, when necessary.

Each of the other additives such as a stabilizer may, for example, be included at a content of 0 to 20 parts by weight, preferably 1 to 15 parts by weight, based on 100 parts by weight of the resin.

The stabilizer that may be used according to one exemplary embodiment of the present invention may, for example, include a calcium-zinc (Ca—Zn)-based stabilizer such as calcium-zinc complex stearate, or a barium-zinc (Ba—Zn)-based stabilizer, but the present invention is not particularly limited thereto.

BEST MODE

EXAMPLES

Hereinafter, the present invention will be described in detail with reference to embodiments thereof in order to describe the present invention more clearly. However, it should be understood that the embodiments of the present invention can be implemented in various forms and are not intended to limit the scope of the present invention. The embodiments of the present invention are provided herein to describe the present invention more fully to persons having ordinary skill in the art.

Preparative Example 1: Preparation of eFAEHE 1,000 g of epoxidized soybean oil (ESO) having an oxirane content of 6.97% and an iodine value of 1.93 ($I_2$/100 g), 500 g of 2-ethylhexyl alcohol (2-EH), 5.5 g of a metal salt catalyst serving as a catalyst were added to a 3 L 4-neck reactor equipped with a cooler, a condenser, a decanter, a reflux pump, a temperature controller, an agitator, etc., and slowly heated to approximately 180° C.

It was confirmed through gas chromatography analysis that ESO as a raw material was completely consumed in a reaction, and the reaction was stopped. After the reaction was completed, 1,210 g of an epoxidized 2-ethylhexyl ester composition having an oxirane content of 5.21% and an iodine value of 1.70 was finally obtained through processes of removing glycerine as a by-product, removing an unreacted raw material, and purifying a product.

Preparative Example 2: Preparation of eFAINE

An epoxidized isononyl ester composition having the same oxirane content and iodine value as listed in the following Table 1 was prepared in the same manner as in Preparative Example 1, except that isononanol was used instead of the 2-ethylhexanol.

Preparative Example 3: Preparation of eFABE

An epoxidized butyl ester composition having the same oxirane content and iodine value as listed in the following Table 1 was prepared in the same manner as in Preparative Example 1, except that butanol was used instead of the 2-ethylhexanol.

Preparative Example 4: Preparation of tributyl citrate (TBC)

706 g (yield: 98%) of tributyl citrate was finally obtained using 384 g of citric acid and 580 g of butanol as raw materials for reaction.

Preparative Example 5: Preparation of tri(2-ethylhexyl) citrate (TEHC)

1,029 g (yield: 98%) of tri(2-ethylhexyl)citrate was finally obtained using 384 g of citric acid and 1,014 g of 2-ethylhexanol as raw materials for reaction.

Preparative Example 6: Preparation of triisononyl citrate (TINC)

1,111 g (yield: 98%) of triisononyl citrate was finally obtained using 384 g of citric acid and 1,123 g of isononanol as raw materials for reaction.

Preparative Example 7: Preparation of eFAEHE

An epoxidized 2-ethylhexyl ester composition having an oxirane content of 3.37% was prepared in the same manner as in Preparative Example 1, except that the oxirane content of the epoxidized soybean oil was lower than that of Preparative Example 1.

Comparative Preparative Example 1: Preparation of eFAME

An epoxidized methyl ester composition was prepared in the same manner as in Preparative Example 1, except that methanol was used instead of the 2-ethylhexanol.

Comparative Preparative Example 2: Preparation of eFAPE

An epoxidized propyl ester composition was prepared in the same manner as in Preparative Example 1, except that propanol was used instead of the 2-ethylhexanol.

Comparative Preparative Example 3: Preparation of eFADDE

An epoxidized dodecyl ester composition was prepared in the same manner as in Preparative Example 1, except that dodecanol was used instead of the 2-ethylhexanol.

EXAMPLES

The plasticizers of examples and comparative examples were composed using the materials prepared in Preparative Examples 1 to 7 and the materials prepared in Comparative Preparative Examples 1 to 3, as listed in the following Table 1.

TABLE 1

| | Epoxidized alkyl ester composition | | | Citrate-based material | Epoxidized oil | Mixing ratio |
|---|---|---|---|---|---|---|
| | Number of carbon atoms | O.C. | I.V. | | | |
| Example 1 | 8 (Preparative Example 1) | 5.21 | 1.70 | TEHC | — | 9:1 |
| Example 2 | 8 (Preparative Example 1) | 5.21 | 1.70 | TEHC | — | 7:3 |
| Example 3 | 8 (Preparative Example 1) | 5.21 | 1.70 | TEHC | — | 3:7 |
| Example 4 | 8 (Preparative Example 1) | 5.21 | 1.70 | TEHC | — | 1:9 |
| Example 5 | 9 (Preparative Example 2) | 5.22 | 1.71 | TBC | — | 5:5 |
| Example 6 | 9 (Preparative Example 2) | 5.22 | 1.71 | TBC | — | 4:6 |
| Example 7 | 4 (Preparative Example 3) | 5.18 | 1.68 | TINC | — | 3:7 |
| Example 8 | 4 (Preparative Example 3) | 5.18 | 1.68 | TINC | — | 2:8 |
| Example 9 | 8 (Preparative Example 7) | 3.37 | 3.40 | TEHC | — | 7:3 |
| Example 10 | 8 (Preparative Example 1) | 5.21 | 1.70 | TEHC | ESO | 7:1:2 |
| Example 11 | 8 (Preparative Example 1) | 5.21 | 1.70 | TEHC | ESO | 4:1:5 |
| Comparative Example 1 | 1 (Comparative Preparative Example 1) | 5.13 | 1.80 | TBC | — | 5:5 |
| Comparative Example 2 | 3 (Comparative Preparative Example 2) | 5.20 | 1.82 | TBC | — | 5:5 |
| Comparative Example 3 | 12 (Comparative Preparative Example 3) | 5.33 | 1.78 | TEHC | — | 5:5 |
| Comparative Example 4 | 8 (Preparative Example 1) | 5.21 | 1.70 | — | — | — |
| Comparative Example 5 | — | — | — | TEHC | — | — |

Experimental Example 1: Preparation and Performance Evaluation of Specimens

The plasticizers of Examples 1 to 11 and Comparative Examples 1 to 5 were used as experimental specimens. The preparation of the specimens was performed with reference to ASTM D638, as follows. 40 parts by weight of a plasticizer and 3 parts by weight of a stabilizer (LOX 912 NP) were blended with 100 parts by weight of PVC in a mixer, and the resulting mixture was then processed at 170° C. for 4 minutes in a roll mill, compressed at 180° C. for 2.5 minutes (at low pressure) and 2 minutes (at high pressure) using a press to prepare 1T and 3T sheets. A physical property test was performed on each of the specimens, as follows. The results are listed in the following Table 2.

<Test Items>

The plasticizers of the examples and the comparative examples were evaluated for the following test items, as follows.

Measurement of Hardness

Shore A hardness at 25° C., 3T 10 s was measured using ASTM D2240.

Measurement of Tensile Strength

By an ASTM D638 method, a specimen was drawn in a cross head speed of 200 mm/min (1T) using a test apparatus, U.T.M (Manufacturer: Instron, Model name: 4466), and a point where the specimen was broken was then measured. The tensile strength was calculated, as follows.

Tensile strength (kgf/mm$^2$)=Load value (kgf)/Thickness (mm)×Width (mm)

Measurement of Elongation Rate

By an ASTM D638 method, a specimen was drawn in a cross head speed of 200 mm/min (1T) using the test apparatus, U.T.M, and a point where the specimen was broken was then measured. The elongation rate was calculated, as follows.

Elongation rate (%)=Length after elongation/Initial length×100

Measurement of Migration Loss

A specimen having a thickness of 2 mm or more was obtained according to KSM-3156, PS plates were attached to both sides of the specimen, and a load of 1 kgf/cm$^2$ was then applied thereto. The specimen was kept in a convection oven (80° C.) for 72 hours, taken out, and then cooled at room temperature for 4 hours. Thereafter, the PS plates attached to both sides of the specimen were removed, and the weights of the specimens before and after being kept in the oven were measured. Then, the migration loss was calculated by the following equation.

Migration loss (%)={(Initial weight of specimen at room temperature−Weight of specimen after being kept in oven)/Initial weight of specimen at room temperature}×100

Measurement of Volatile Loss

The specimen thus prepared was processed at 80° C. for 72 hours, and a weight of the specimen was measured.

Volatile loss (%)=Initial weight of specimen−(Weight of specimen after being processed at 80° C. for 72 hours/Initial weight of specimen)×100

TABLE 2

| | Hardness (Shore A) | Tensile strength (kg/cm$^2$) | Elongation rate (%) | Migration loss (%) | Volatile loss (%) |
|---|---|---|---|---|---|
| Example 1 | 87.0 | 216.1 | 305.9 | 2.85 | 1.86 |
| Example 2 | 87.3 | 225.7 | 313.5 | 2.37 | 1.62 |
| Example 3 | 87.5 | 227.1 | 311.9 | 2.14 | 1.23 |
| Example 4 | 87.8 | 230.5 | 313.5 | 1.84 | 0.60 |
| Example 5 | 85.3 | 220.7 | 308.5 | 1.65 | 2.87 |
| Example 6 | 85.0 | 221.4 | 305.7 | 1.40 | 2.93 |
| Example 7 | 87.5 | 235.6 | 312.2 | 2.45 | 1.03 |
| Example 8 | 87.6 | 238.7 | 310.8 | 2.50 | 1.00 |
| Example 9 | 87.5 | 220.4 | 303.7 | 2.50 | 1.55 |
| Example 10 | 87.1 | 237.8 | 320.5 | 1.88 | 1.20 |
| Example 11 | 87.3 | 248.7 | 322.4 | 1.92 | 0.75 |
| Comparative Example 1 | 82.4 | 184.6 | 284.5 | 3.51 | 7.80 |
| Comparative Example 2 | 85.3 | 195.6 | 283.2 | 3.30 | 6.58 |
| Comparative Example 3 | 87.8 | 220.8 | 308.2 | 4.60 | 2.22 |
| Comparative Example 4 | 86.8 | 204.9 | 308.0 | 3.36 | 2.41 |
| Comparative Example 5 | 89.0 | 231.0 | 295.6 | 5.60 | 0.42 |

Referring to Table 2, it can be seen that all the plasticizer compositions of Examples 1 to 11 exhibited excellent physical properties in balance without having inferior physical properties, whereas the plasticizer compositions prepared in Comparative Examples 1 to 5 were difficult to apply to the plasticizer composition because the plasticizer compositions had poor levels in all physical properties or particularly poor levels in one or two or more physical properties.

Specifically, it can be seen that a considerable amount of the epoxidized alkyl ester composition was volatilized during processing because the epoxidized alkyl ester composition had a fewer number of carbon atoms, that is, 1 and 3 carbon atoms, respectively, in the case of Comparative Examples 1 and 2, resulting in a drastic drop in physical properties, for example, a high level of migration loss and volatile loss. However, it was confirmed that the plasticizer compositions of Examples 7 and 8 in which an epoxidized alkyl ester composition having 4 carbon atoms was used had significantly lower volatile loss and migration loss, compared to the plasticizer compositions of Comparative Examples 1 and 2, although the plasticizer compositions of Examples 7 and 8 did not have a relatively significant difference in the number of carbon atoms.

Also, in the case of Comparative Example 3, it was revealed that the plasticizer composition had a rather poor migration loss approximately two-fold higher than the plasticizer compositions of the examples because the epoxidized alkyl ester composition had a very high number of carbon atoms, that is, 12 carbon atoms.

In addition, it can be seen that, when comparing the plasticizer compositions Examples 1 to 4 with the plasticizer compositions of Comparative Examples 4 and 5, in which a mixture of the respective materials was not used, physical properties did not linearly change but there was a synergistic effect on physical properties such as elongation rate, migration loss and volatile loss, indicating that the physical properties were improved to a level higher than the physical properties exhibited by the two materials.

Further, when Example 1 was compared with Examples 10 and 11, the effect exhibited by further addition of the epoxidized oil was able to be confirmed. In this case, it was revealed that the tensile strength and elongation rate, and the migration loss and volatile loss were all improved. From these results, it can be seen that the physical properties of the plasticizer compositions were able to be improved when the epoxidized oil was further added to the epoxidized alkyl ester composition and the citrate-based material.

The invention claimed is:

1. A plasticizer composition comprising:
an epoxidized alkyl ester composition comprising one or more compounds represented by the following Chemical Formula 1; and an alkyl ester composition comprising one or more compounds represented by the following Chemical Formula 2, and
one or more citrate-based materials,
wherein a weight ratio of the epoxidized alkyl ester composition and the citrate-based material is in a range of 90:10 to 10:90:

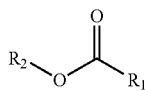

[Chemical Formula 1]

wherein $R_1$ is an alkyl group containing one or more epoxy groups and having 8 to 20 carbon atoms, and $R_2$ is an alkyl group having 4 to 10 carbon atoms,

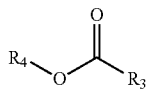

[Chemical Formula 2]

wherein $R_3$ is an alkyl group having 8 to 20 carbon atoms, and $R_4$ is an alkyl group having 4 to 10 carbon atoms, and
wherein the citrate-based materials are materials which do not have an acetyl group bound thereto.

2. The plasticizer composition of claim 1, wherein the epoxidized alkyl ester composition has an iodine value of less than 3.5 $I_2$/100 g.

3. The plasticizer composition of claim 1, wherein the epoxidized alkyl ester composition has an oxirane content (O.C.) of 3.5% or more.

4. The plasticizer composition of claim 1, wherein the epoxidized alkyl ester composition has an oxirane index (O.I.) of 1.0 or more.

5. The plasticizer composition of claim 1, wherein $R_2$ in Chemical Formula 1 is an alkyl group having 4 to 9 carbon atoms.

6. The plasticizer composition of claim 1, wherein $R_2$ in Chemical Formula 1 is selected from the group consisting of a butyl group, an isobutyl group, a pentyl group, a hexyl group, a heptyl group, an isoheptyl group, an octyl group, a 2-ethylhexyl group, a nonyl group, an isononyl group, a 6-methyloctyl group, a decyl group, an isodecyl group, and a 2-propylheptyl group.

7. The plasticizer composition of claim 1, wherein the epoxidized alkyl ester composition comprises two or more compounds having a different number of carbon atoms in $R_2$ in Chemical Formula 1.

8. The plasticizer composition of claim 1, wherein the citrate-based materials are selected from the group consisting of a hybrid alkyl-substituted citrate-based material having 4 to 10 carbon atoms, and a non-hybrid alkyl-substituted citrate-based material having 4 to 10 carbon atoms.

9. A resin composition comprising 100 parts by weight of a resin; and 5 to 150 parts by weight of the plasticizer composition defined in claim 1.

10. The resin composition of claim 9, wherein the resin comprises one or more selected from the group consisting of ethylene vinyl acetate, polyethylene, polypropylene, polyketone, polyvinyl chloride, polystyrene, polyurethane, and a thermoplastic elastomer.

* * * * *